United States Patent
Farooqui et al.

(10) Patent No.: US 11,417,212 B1
(45) Date of Patent: Aug. 16, 2022

(54) RISK MANAGEMENT SYSTEM WITH INTERNET OF THINGS

(71) Applicant: Allstate Insurance Company, Northbrook, IL (US)

(72) Inventors: Sohail Farooqui, Round Lake Beach, IL (US); Enriqueta Zurlo, Park Ridge, IL (US); Jeraldine Dahlman, Evanston, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 376 days.

(21) Appl. No.: 16/397,747

(22) Filed: Apr. 29, 2019

(51) Int. Cl.
| | |
|---|---|
| *G08G 1/16* | (2006.01) |
| *G06Q 40/08* | (2012.01) |
| *H04L 67/12* | (2022.01) |
| *H04W 4/46* | (2018.01) |

(52) U.S. Cl.
CPC ............. *G08G 1/163* (2013.01); *G06Q 40/08* (2013.01); *G08G 1/166* (2013.01); *H04L 67/12* (2013.01); *H04W 4/46* (2018.02)

(58) Field of Classification Search
CPC ........ G08G 1/163; G08G 1/166; H04L 67/12; H04W 4/46; G06Q 40/08
See application file for complete search history.

(56) References Cited

U.S. PATENT DOCUMENTS

| | | |
|---|---|---|
| 7,085,637 B2 | 8/2006 | Breed et al. |
| 7,421,321 B2 | 9/2008 | Breed et al. |
| 10,037,668 B1 | 7/2018 | DesGarennes et al. |
| 10,043,376 B1 | 8/2018 | Poornachandran et al. |
| 2015/0045063 A1 | 2/2015 | Mishra et al. |
| 2016/0171864 A1 | 6/2016 | Ciaramelletti et al. |
| 2017/0177798 A1 | 6/2017 | Samuel et al. |
| 2017/0227965 A1 | 8/2017 | Decenzo et al. |
| 2018/0060159 A1 | 3/2018 | Justin et al. |
| 2018/0168464 A1 | 6/2018 | Barnett, Jr. et al. |
| 2018/0176727 A1 | 6/2018 | Williams |
| 2018/0181094 A1 | 6/2018 | Funk et al. |
| 2018/0182187 A1 | 6/2018 | Tong et al. |
| 2018/0225605 A1 | 8/2018 | Fabara et al. |

(Continued)

OTHER PUBLICATIONS

Zenon Chaczko, Frank Jiang and Benazir Ahmed, "Road Vehicle Alert System Using IOT," visited Sep. 21, 2018, <https://ieeexplore.ieee.org/document/8121714>.

(Continued)

*Primary Examiner* — Michael V Kerrigan
(74) *Attorney, Agent, or Firm* — Dinsmore & Shohl LLP (57) ABSTRACT

A risk management system that includes an internet of things (IoT) integrated logic engine connected to IoT-capable sensors and devices and autonomous entity sensors and devices. The logic engine processes and analyzes in real-time the data from the plurality of IoT-capable sensors and the autonomous entity sensors. The logic engine further identifies novel patterns and pre-defined data patterns in the data from the plurality of IoT-capable sensors and the autonomous entity sensors to determine that a risk is occurring or imminent. The logic engine further sends real-time notifications to a set of subscribers of the risk management system about the risk that is occurring or imminent and provide inter-device communications to provide real-time warnings between one or more of the plurality of sensor-enabled devices and the autonomous entity devices.

20 Claims, 6 Drawing Sheets

(56) References Cited

U.S. PATENT DOCUMENTS

| | | |
|---|---|---|
| 2018/0241764 A1 | 8/2018 | Nadolski et al. |
| 2018/0246780 A1 | 8/2018 | Acharya et al. |

OTHER PUBLICATIONS

Trinity IOT Applied Building, "Digital Platforms. Transform the Way we Live and Work," visited Sep. 21, 2018, <http://www.trinityiot.in/>.

A. Jesudoss, Muthuram .B.O. and Lourdson Emmanuel .A, "Safe Driving Using lot Sensor," visited Sep. 31, 2018, <https://acadpubl.eu/hub/2018-118-21/articles/21e/3.pdf>.

Striim, "Detecting Patterns and Anomalies—Uncover Time-Sensitive Insights Fast," visited Sep. 21, 2018, <https://www.striim.com/solutions/detecting-patterns-anomalies/>.

Antonio M. Lopes, Paulo Abreu and Maria Teresa Restivo, "Analysis and Pattern Identification on Smart Censors data," visited Sep. 21, 2018, <https://ieeexplore.ieee.org/document/7984409>.

Duck Jin Chai, Long Jin, Kyoung Ho Bae, Buhyun Hwang and Keun Ho Ryu, "Continuous Sensor Data Mining Model and System Design," visited Sep. 21, 2018, <https://ieeexplore.ieee.org/document/4568554>.

John Treadway, "Using an IoT Gateway to Connect the "Things" to the Cloud," visited Sep. 21, 2018, <https://www.researchgate.net/publication/220283962_Sensor_data_analysis_for_equipment_monitoring>.

A. C. B. Garcia, Cristiana Bentes, Rafael Heitor C. De Melo and Thadeu Penna, "Sensor Data Analysis for Equipment Monitoring," visited Sep. 21, 2018, <https://www.researchgate.net/publication/220283962_Sensor_data_analysis_for_equipment_monitoring>.

Data From Sky, "A Sensor Data Fusion System Based on k-Nearest Neighbor Pattern Classification for Structural Health Monitoring Applications," visited Sep. 21, 2018, <http://datafromsky.com/>.

Nida Saddaf Khan, Sayeed Ghani and Sajjad Haider, "Real-Time Analysis of a Sensor's Data for Automated Decision Making in an IoT-Based Smart," visited Sep. 21, 2018, <https://www.ncbi.nlm.nih.gov/pmc/articles/PMC6022067/>.

Jean-Aime Maxa, Mohamed-Slim Ben Mahmoud, Nicolas Larrieu, "Extended Verification of Secure UAANET Routing Protocol," dated Sep. 13, 2016.

RISK MANAGEMENT SYSTEM WITH INTERNET OF THINGS

FIELD OF THE INVENTION

The present invention relates to various systems for an internet of things (IoT) risk management system and methods for a risk management system utilizing the internet of things (IoT).

BACKGROUND

Aspects of the disclosure generally relate to the internet of things (IoT) and the information acquired and stored within the IoT, such as: security and surveillance; building management; vehicle, asset, person, and pet monitoring and controlling; agriculture automation; energy consumption; machine-to-machine (M2M) and wireless sensor network; everyday things; healthcare; embedded mobile; and smart homes and cities.

Aspects of this disclosure also generally relate to autonomous entities. Autonomous entities may include, but not be limited to: autonomous vehicles, drones for surveillance and delivery of goods, and mail and delivery drones. Autonomous entities have various sensors to know what is around the autonomous entity to safely navigate, mostly on a local-street level and may be proprietary and vendor-driven.

Over several technologies, the IoT includes data from physical devices connecting to the internet to achieve a purpose. How can this data and the data from the autonomous entities be utilized to help understand risk and mitigate risk, specifically with autonomous entities? What happens when these autonomous entities do not communicate properly? This lack of communication or miscommunication may cause, for example, vehicle accidents, traffic jams, and missed opportunities for collaboration and increased efficiencies. Additionally, who bears the responsibility and liability in these instances and what risk is inherent in using autonomous systems? Additionally, a degree of public acceptance and marketing strengths of new technologies will influence the successful prevalence of autonomous entities.

There is a need for a risk management system that integrates the information and data from a variety of sensors feeding into the IoT, such as, for example, from autonomous vehicles, drones, sensors and infrastructure, and smart homes and buildings. There is a further need for the risk management system to process and analyze the information using artificial intelligence in real-time or near real-time to determine patterns with cross-device or cross-industry information. There is a further need for the risk management system to send alerts and messages to relevant entities based on these risks.

SUMMARY

Aspects of this disclosure overcome problems and limitations of the prior art by providing systems and methods for risk management that includes a protocol-agnostic data aggregator of sensor data across a diverse set of sensor-enabled products across many manufacturers within the internet of things (IoT) for autonomous entities.

Various approaches to risk management are presented. In accordance with aspects of this disclosure, a risk management system may include a plurality of internet of things (IoT)-capable sensors connected to an IoT system, a plurality of autonomous entity sensors connected to the risk management system, and an IoT integrated logic engine connected to the IoT system that includes a processor that provides a protocol-agnostic data aggregator of the data from the plurality of IoT-capable sensors connected to the IoT system. The plurality of IoT-capable sensors may be configured to record data from a plurality of sensor-enabled devices within the IoT system. The plurality of autonomous entity sensors may be configured to record data from a plurality of autonomous entity devices. The autonomous entity devices may include one or more of the following: one or more autonomous vehicles and one or more drones. The processor and a memory unit storing computer-executable instructions, which when executed by the processor, cause the processor to: receive and aggregate data from the plurality of IoT-capable sensors from the plurality of sensor-enabled devices; receive and aggregate data from the plurality of autonomous entity sensors from the autonomous entity devices; process and analyze in real-time the data from the plurality of IoT-capable sensors and the autonomous entity sensors; identify novel patterns and pre-defined data patterns in the data from the plurality of IoT-capable sensors and the autonomous entity sensors; determine that a risk is occurring or imminent based on the novel patterns and pre-defined data patterns from the plurality of IoT-capable sensors and the autonomous entity sensors; send real-time notifications to a set of subscribers of the risk management system about the risk that is occurring or imminent; and provide inter-device communications to provide real-time warnings between one or more of the plurality of sensor-enabled devices and the autonomous entity devices.

In accordance with other aspects of this disclosure, one or more non-transitory computer readable media storing computer readable instructions that, when executed, cause an apparatus to: (a) receive and aggregate data, by an internet of things (IoT) integrated logic engine connected to an IoT system, from a plurality of IoT-capable sensors from a plurality of sensor-enabled devices, the plurality of IoT-capable sensors connected to the IoT system and configured to record data from the plurality of sensor-enabled devices within the IoT system, wherein the IoT system includes a processor that provides a protocol-agnostic data aggregator of the data from the plurality of IoT-capable sensors connected to the IoT system; (b) receive and aggregate data, by the IoT integrated logic engine, from a plurality of autonomous entity sensors from one or more autonomous entity devices, the plurality of autonomous entity sensors connected to the IoT integrated logic engine and configured to record data from the plurality of autonomous entity devices, wherein the autonomous entity devices include one or more of the following: one or more autonomous vehicles and one or more drones; (c) process and analyze in real-time the data, by the IoT integrated logic engine, from the plurality of IoT-capable sensors and the autonomous entity sensors; (d) identify novel patterns and pre-defined data patterns in the data, by the IoT integrated logic engine, from the plurality of IoT-capable sensors and the autonomous entity sensors; (e) determine, by the IoT integrated logic engine, that a risk is occurring or imminent based on the novel patterns and pre-defined data patterns from the plurality of IoT-capable sensors and the autonomous entity sensors; (f) send real-time notifications, by the IoT integrated logic engine, to a set of subscribers about the risk that is occurring or imminent; and (g) provide inter-device communications, by the IoT integrated logic engine, to provide real-time warnings between the plurality of IoT-capable sensors and the autonomous entity sensors.

In accordance with another aspect of this disclosure, a risk management system may include a plurality of internet of things (IoT)-capable sensors connected to an IoT system, a plurality of autonomous entity sensors connected to the risk management system, and an IoT integrated logic engine connected to the IoT system that includes a processor that provides a protocol-agnostic data aggregator of the data from the plurality of IoT-capable sensors connected to the IoT system. The plurality of IoT-capable sensors may be configured to record data from a plurality of sensor-enabled devices within the IoT system. The plurality of autonomous entity sensors may be configured to record data from a plurality of autonomous entity devices. The autonomous entity devices may include one or more of the following: one or more autonomous vehicles and one or more drones. The processor and a memory unit storing computer-executable instructions, which when executed by the processor, may cause the processor to: receive and aggregate data from the plurality of IoT-capable sensors from the plurality of sensor-enabled devices; receive and aggregate data from the plurality of autonomous entity sensors from the autonomous entity devices; process and analyze in real-time the data from the plurality of IoT-capable sensors and the autonomous entity sensors; identify novel patterns and pre-defined data patterns in the data from the plurality of IoT-capable sensors and the autonomous entity sensors; determine that a risk is occurring or imminent based on the novel patterns and pre-defined data patterns from the plurality of IoT-capable sensors and the autonomous entity sensors; utilize a scoring algorithm for valuing new data from the plurality of IoT-capable sensors and the plurality of autonomous entity sensors; determine a potential impact to the risk based on the new data and the scoring algorithm; send real-time notifications to a set of subscribers of the risk management system about the risk that is occurring or imminent; and provide inter-device communications to provide real-time warnings between one or more of the plurality of sensor-enabled devices and the autonomous entity devices, wherein the real-time warnings include information from nearby sensor-enabled devices based upon location, speed, direction, and mapping, and further wherein the real-time warnings includes one or more of the following: inter-device proximity alerts, inter-device collision course alerts, inter-device dangerous conditions alerts.

The details of these and other embodiments of this disclosure are set forth in the accompanying drawings and description below. Other features and advantages of aspects of this disclosure will be apparent from the description and drawings.

The reader is advised that the attached drawings are not necessarily drawn to scale.

It will be apparent to one skilled in the art after review of the entirety disclosed that the steps illustrated in the figures listed above may be performed in other than the recited order, and that one or more steps illustrated in these figures may be optional.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
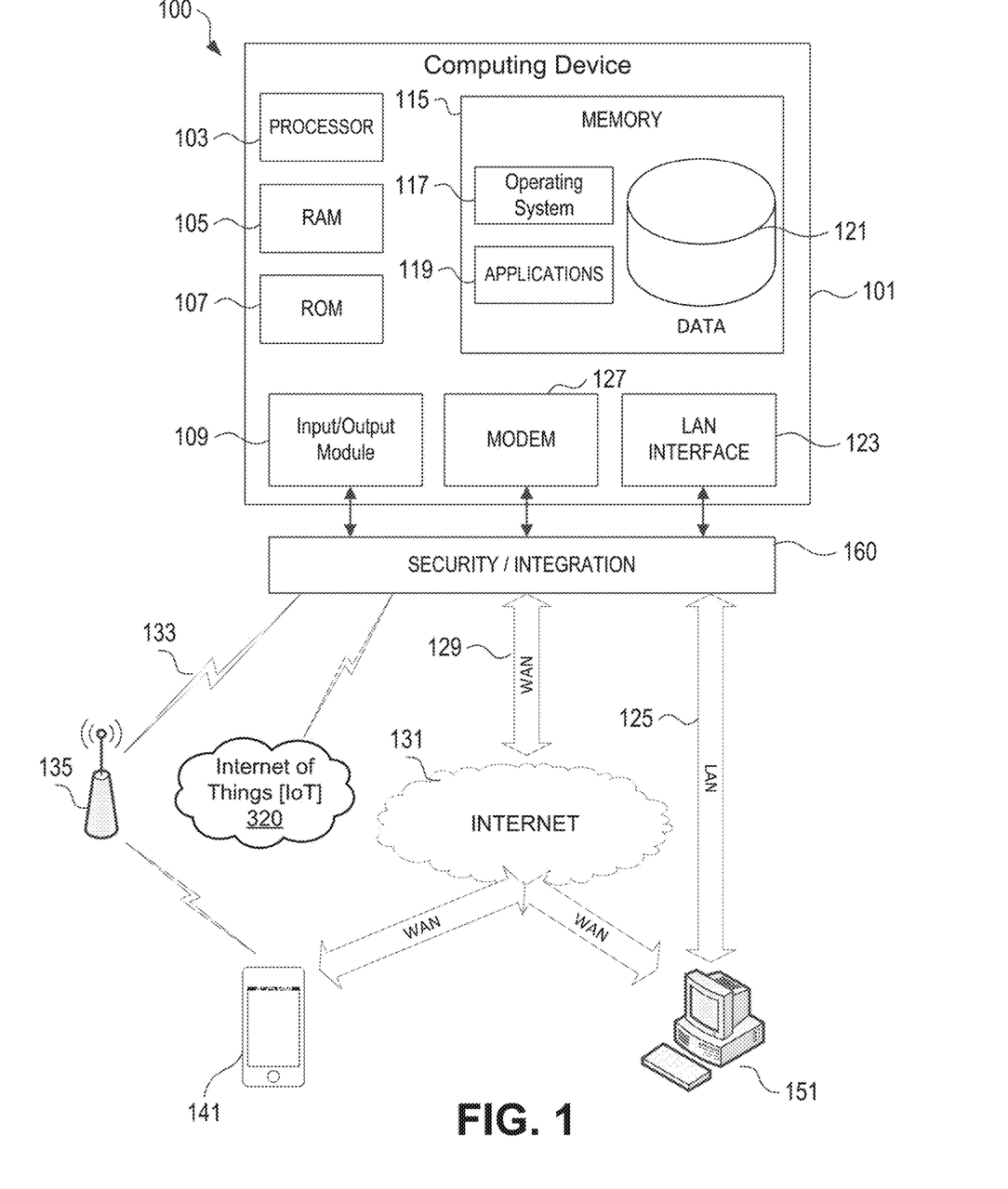
FIG. 1 illustrates a network environment and computing systems that may be used to implement aspects of the disclosure.

FIG. 1 illustrates a block diagram of an example risk management system 101 in a network environment 100 that may be used according to one or more illustrative arrangements of the disclosure. The risk management system 101 may have a processor 103 for controlling overall operation of the risk management system 101 and its associated components, including RAM 105, ROM 107, input/output device 109, and memory 115. The risk management system 101, along with one or more additional devices (e.g., terminals 141, 151) may correspond to any of multiple systems or devices, such as various servers or systems. The risk management system 101 may also be connected to the internet of things (IoT) 220. The IoT 220 may include, but not be limited to information, sensor data, and other pertinent data related to: security and surveillance; building management; vehicle, asset, person, and pet monitoring and controlling; agriculture automation; energy consumption; machine-to-machine (M2M) and wireless sensor network; everyday things; healthcare; embedded mobile; and smart homes and cities.

Input/Output (I/O) 109 may include a microphone, keypad, touch screen, cameras, sensors, and/or stylus through which a user of the risk management system 101 may provide input, and may also include one or more of a speaker for providing audio output and a video display device for providing textual, audiovisual and/or graphical output. Software may be stored within memory 115 and/or storage to provide instructions to processor 103 for enabling the risk management system 101 to perform various functions. For example, memory 115 may store software used by the risk management system 101, such as an operating system 117, application programs 119, and an associated internal database 121. Processor 103 and its associated components may allow the connected home sensing device/system 101 to execute a series of computer-readable instructions to receive data associated with the IoT 220.

The risk management system 101 may operate in a network environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the connected home sensing device/system 101. The network connections depicted in FIG. 1 include one or more of a local area network (LAN) 125 and a wide area network (WAN) 129, and a wireless telecommunications network 133, but may also include other networks, such as Bluetooth, ZigBee, or Z-Wave. When used in a LAN networking environment, the risk management system 101 may be connected to the LAN 125 through a network interface or adapter 123. When used in a WAN networking environment, the risk management system 101 may include a modem 127 or other means for establishing communications over the WAN 129, such as network 131 (e.g., the Internet). When used in a wireless telecommunications network 133, the connected home sensing device/system 101 may include one or more transceivers, digital signal processors, and additional circuitry and software for communicating with wireless computing devices 141 (e.g., mobile phones, portable computing devices, appliances, smart devices, and other devices and systems within the IoT 220) via one or more network devices 135 (e.g., base transceiver stations) in the wireless network 133.

It will be appreciated that the network connections shown are illustrative and other means of establishing a communications link between the devices and computers may be used. The existence of any of various network protocols such as TCP/IP, Ethernet, FTP, HTTP and the like, and of various wireless communication technologies such as GSM, CDMA, Wi-Fi, WiMAX, and wireless mesh networks, is presumed, and the various computing devices and system components described herein may be configured to communicate using any of these network protocols or technologies.

Additionally, one or more application programs 119 used by the risk management system 101 may include computer-executable instructions for receiving and aggregating data from a plurality of IoT capable sensors 220 and receiving and aggregating data from autonomous entity sensors. Furthermore, one or more application programs 119 used by the risk management system 101 may include computer-readable instructions for processing and analyzing the data from the plurality of IoT capable sensors 220 and the autonomous entity sensors. The application programs 119 may also be used to identify novel patterns and pre-defined data patterns that a risk is occurring or imminent and sending notifications to a set of subscribers about the risk occurring or imminent. The application program 119 may also be used to provide inter-device communications to provide warnings between IoT devices and autonomous entities and to display warnings on one or more of the IoT devices or the autonomous entities.

The systems described herein may be used by an insurance company, financial institution or other entity to monitor one or more IoT devices/sensors and/or one or more autonomous entities. Although many examples herein will be described as being used in conjunction with an insurance company, the systems and methods described herein may be used by or with other entities or types of entities without departing from the invention.

Figure 2:
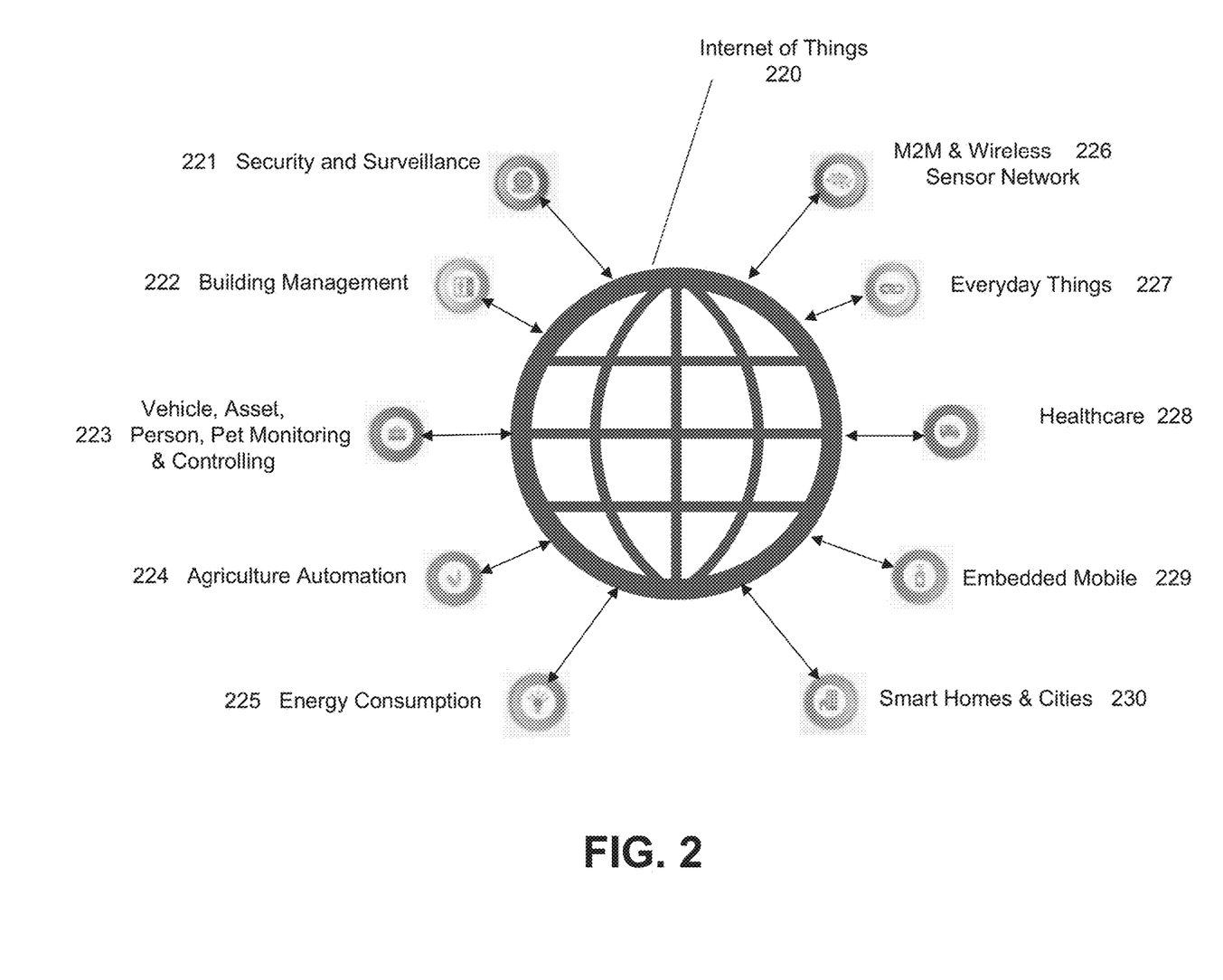
FIG. 2 is a illustrative representation of an exemplary internet of things (IoT) according to one or more aspects described herein.

FIG. 2 shows an illustrative representation of the internet of things (IoT) 220. The IoT 220 generally refers to the concept of extending Internet connectivity beyond conventional computing platforms such as personal computers and mobile devices, and into any range of traditionally unconnected or non-internet-enabled physical devices and everyday objects, thereby enabling these devices and objects to send and receive data. The IoT 220 is a system of interrelated computing devices, mechanical and digital machines, objects, animals or people that are provided with unique identifiers (UIDs) and the ability to transfer data over a network without requiring human-to-human or human-to-computer interaction. As illustrated in FIG. 2, the IoT 220 may include the following sources: security and surveillance 221; building management 222; vehicle, asset, person, and pet monitoring and controlling 223; agriculture automation 224; energy consumption 225; machine-to-machine (M2M) and wireless sensor network 226; everyday things 227; healthcare 228; embedded mobile 229; and smart homes and cities 230. Other sources may be utilized with the IoT 220 without departing from this invention. Each of these sources may include sensors and devices to transfer data over the IoT 220.

Figure 3:
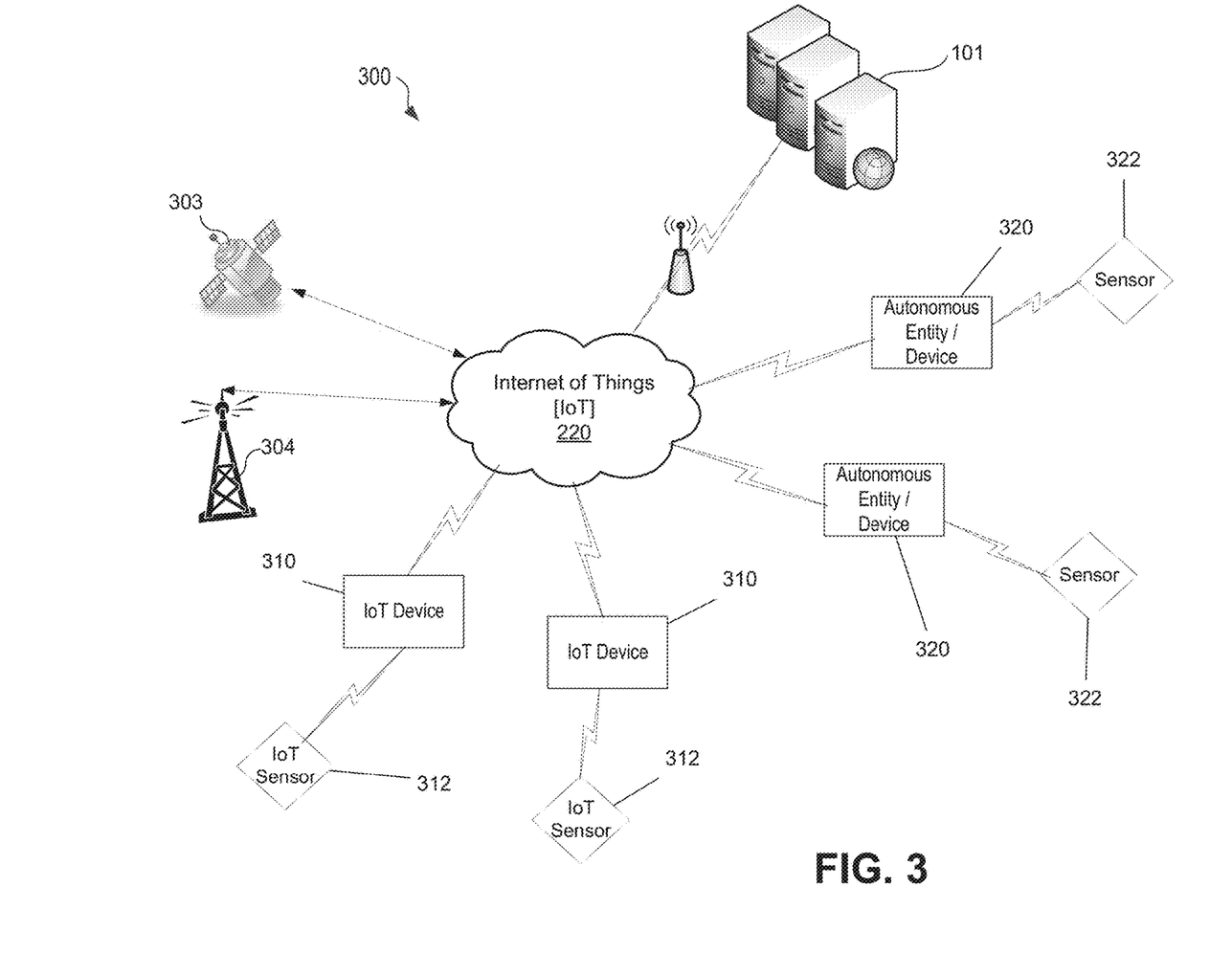
FIG. 3 is a schematic diagram of an exemplary risk management network environment according to one or more aspects described herein.

FIG. 3 shows an illustrative risk management network environment 300 for implementing methods according to the present disclosure. The risk management network environment 300 may include a risk management system 305 configured to connect devices within or associated with the IoT 220 via one or more satellites 303 and one or more cellular network elements 304 (e.g., cell towers). The specific risk management system 305 may be similar to and include similar components to the risk management system 101 as described above and illustrated in FIG. 1. The IoT 220 may also include the interconnect ability of one or more IoT devices 310 and one or more IoT sensors 312, and one or more autonomous entities/devices 320 and one or more autonomous entity sensors 322.

The risk management network environment 300 may be any type of network, such as the Internet 131, a telecommunications network, etc. described above, and may use one or more communication protocols (e.g., protocols for the Internet (IP), Bluetooth, cellular communications, satellite communications, etc.) to connect the IoT devices 310 and the autonomous entities/devices 320 and servers within the risk management network environment 300 to send and receive data, information, and communications between the different devices. In some cases, the risk management network environment 300 may include a cellular network and its components, such as base stations. Accordingly, for example, one or more mobile computing devices 141 (e.g., a smartphone) of users within the IoT devices 310 and the autonomous entities/devices 320 may communicate, via a cellular backhaul of the network 301, with an application server 305 which in turn may communicate, via the cellular backhaul of the network 301, with the IoT devices 310 and the autonomous entities/devices 320 to provide notifications.

While the illustrative example of FIG. 3 shows two IoT devices 310 and autonomous entities/devices 320, the risk management system 305 may be configured to communicate with multiple IoT devices 310 and autonomous entities/devices 320 simultaneously.

Figure 4A:
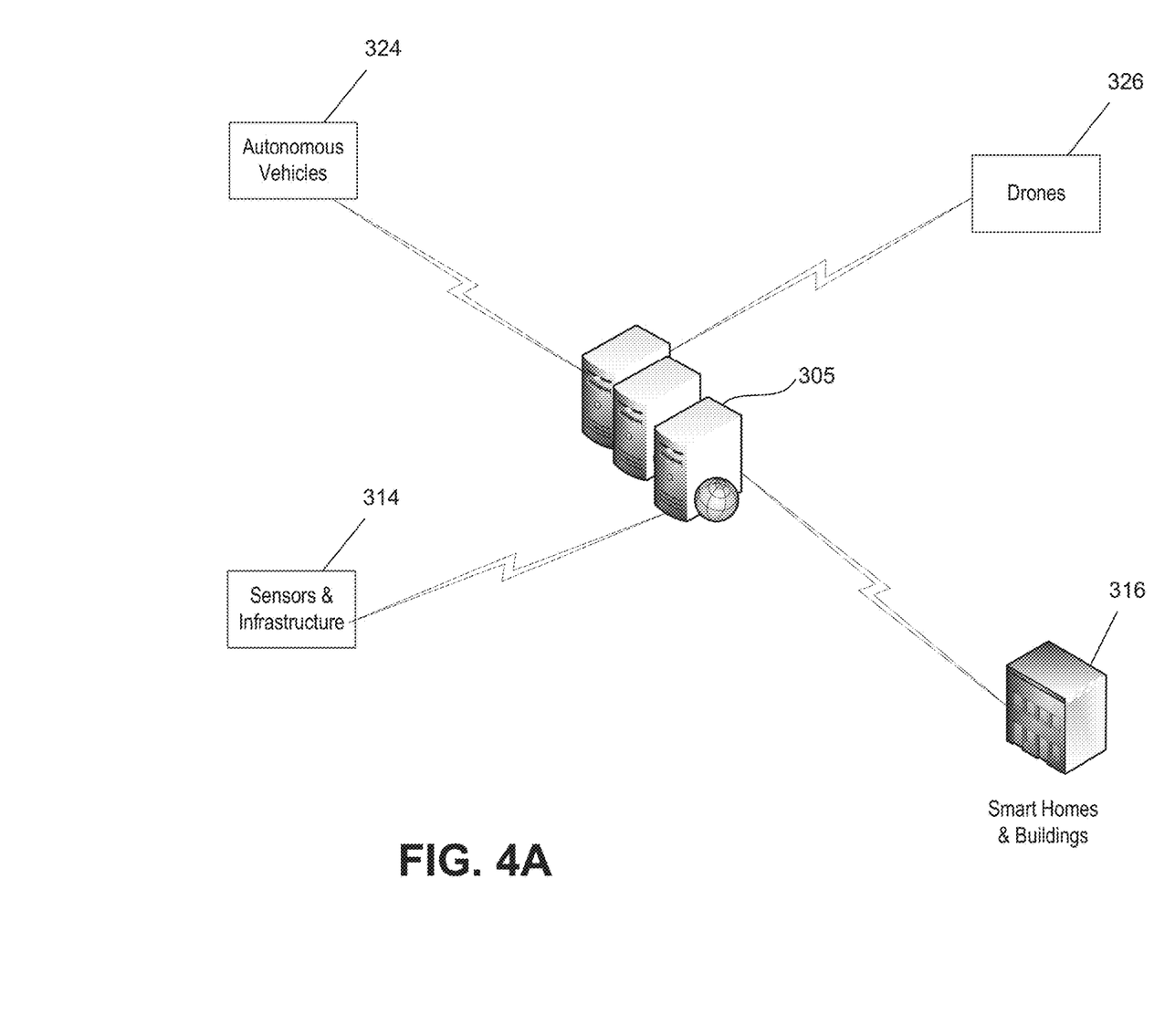
FIG. 4A is a schematic diagram of an exemplary risk management system according to one or more aspects described herein.

FIG. 4A shows an illustrative risk management system 305 in accordance with aspects of this invention. The risk management system 305 may include a logic engine or processor within the IoT 220 that is interconnected to various devices within the IoT 202, such as sensors and infrastructure 314, smart homes and buildings 316, autonomous vehicles 324, and drones 326. The risk management system 305 will include input and data from a variety of sensors 312, 322 feeding into the IoT 220. The risk management system 305 and the logic engine may process this input and data in real-time or near-real-time. Additionally, the risk management system 305 may send alerts and messages to relevant entities, such as a set of subscribers that would be most interested in. The set of subscribers may include one or more of the following: individual users, government agencies, retail organizations, home owners, and/or insurance companies.

Figure 4B:
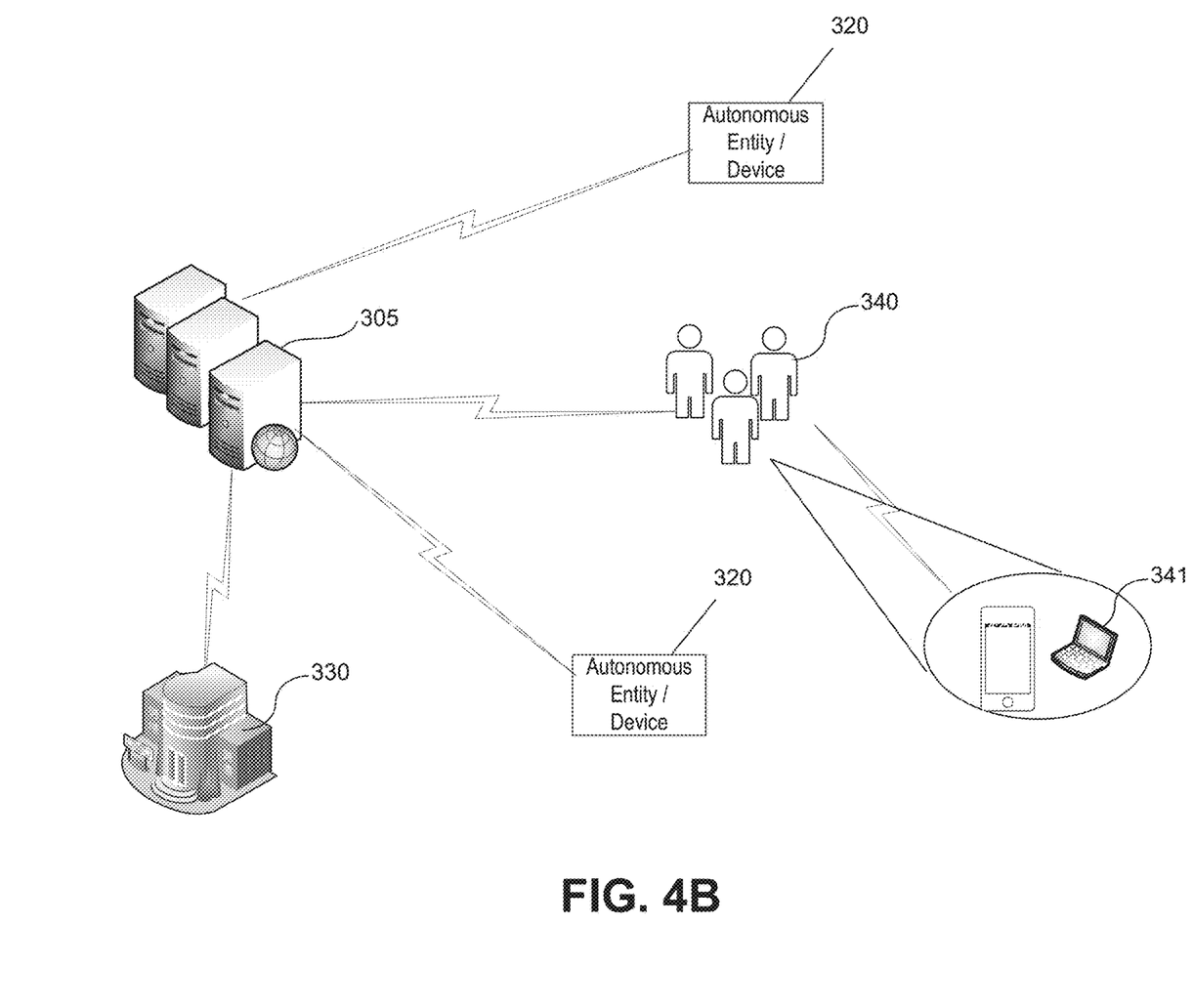
FIG. 4B is a schematic diagram of an exemplary risk management system according to one or more aspects described herein.

FIG. 4B also shows an illustrative subsystem within the risk management network environment 300. Specifically, FIG. 4B shows an illustrative arrangement of devices that may exist within the risk management system 305 to send notifications to subscribers or relevant entities about either standard risk patterns or unusual patterns and/or to facilitate inter-device communication to provide real-time warnings between devices. The risk management system 305 may include and be connected to one or more autonomous entity/devices 310, one or more users/subscribers 340, and one or more organizations (such as government agencies, retail, home owners, insurance companies). In some embodiments, the users 340 may include a user mobile computing device 341 may communicate with one another (e.g., via BLUETOOTH, Internet, etc.). The user mobile computing device 341 may be any mobile computing device (e.g., a smartphone, tablet, etc.) that is associated with a user 340. The user mobile computing device 341 and/or other devices and servers (e.g., 141, 151, and 305) may be configured in a similar manner to the computing device 101 of FIG. 1.

Further, the IoT devices 310, the autonomous entity/device 320, and the user mobile computing device 341 may be configured to execute a mobile device program that provides computer-executable instructions for collecting and communicating IoT data and the autonomous entity data to the risk management system 305 and the IoT 220. Also, the IoT devices 310, the autonomous entity/device 320, and the user mobile computing device 341 may include a user interface for a user to provide inputs to and receive outputs from the risk management system 305 and the IoT 220. Such a mobile device program may be downloaded or otherwise installed onto the IoT devices 310, the autonomous entity/device 320, and the user mobile computing device 341 using one or more different methods. Once installed onto the IoT devices 310, the autonomous entity/device 320, and the user mobile computing device 341, a user may launch the mobile device program by, for example, operating buttons or a touchscreen on the IoT devices 310, the autonomous entity/device 320, and the user mobile computing device 341. Additionally, or alternatively, the IoT devices 310, the autonomous entity/device 320, and the user mobile computing device 341 may be configured to execute a web browser (e.g., an application for accessing and navigating the Internet) to access a webpage providing an interface for the risk management system 305.

In some embodiments, the IoT devices 310, the autonomous entity/device 320, and the user mobile computing device 341 may also be configured to collect data using, e.g., sensors, accelerometers, GPS, gyroscope, etc. of the IoT devices 310, the autonomous entity/device 320, and the user mobile computing device 341. IoT data may include: home and user entertainment data, heating and air conditioning home data, lighting data, security data, home insurance information, maintenance and repair information, safety information, navigation data, vehicle insurance information, communication information, food ordering information, other ordering information, payment data, traffic information, meters and parking data, road and rail information, health monitoring, prescription compliance, health safety information, supply chain efficiency information, fleet management, business customer data, inventory management information, manufacturing efficiency information, and inventory management information. Additionally, the data may include location information, such as GPS coordinates, indicating the geographical location of the IoT devices 310, the autonomous entity/device 320, and the user mobile computing device as well as speed and acceleration data for autonomous vehicles.

As discussed above, the risk management system 305 may include the IoT devices 310, the autonomous entity/device 320, and the user mobile computing device 341. The IoT devices 310, the autonomous entity/device 320, and the user mobile computing device 341 may be configured in a similar manner to the computing device 101 of FIG. 1A. Further, the IoT devices 310, the autonomous entity/device 320, and the user mobile computing device 341 may be configured to execute the mobile device program in addition to, or instead of, the mobile computing device 141. In some cases, the IoT devices 310, the autonomous entity/device 320, the user mobile computing device 341, and the mobile computing device 141 may operate in conjunction so that the IoT devices 310, the autonomous entity/device 320, and the user mobile computing device 341 performs some modules of the mobile device program while the mobile computing device 141 performs other modules of the mobile device program. For example, the IoT devices 310, the autonomous entity/device 320, and the user mobile computing device 341 may collect data and communicate the data, via a wired (e.g., USB) or wireless (e.g., BLUETOOTH) connection, to a mobile computing device 141 within the risk management system 305 so that the risk management system 305 may evaluate the data and/or send notifications.

Further, the IoT devices 310, the autonomous entity/device 320, and the user mobile computing device 341 may be configured to connect to one or more devices (e.g., a GPS, sensors, etc.) within the IoT 220, such as to collect and share the data. In some embodiments, the IoT devices 310, the autonomous entity/device 320, and the user mobile computing device 341 may be a computing system including multiple devices. The IoT devices 310, the autonomous entity/device 320, and the user mobile computing device 341 may be configured to interface with one or more sensors within or outside of the IoT 220. The IoT devices 310, the autonomous entity/device 320, and the user mobile computing device 341 may be configured to communicate directly or indirectly with the risk management system 305.

In some cases, the risk management network environment 300 may include one or more risk management systems or servers 305. The risk management systems or servers 305 may be configured to transfer, transmit, and collect data and notifications from the IoT devices 310, the autonomous entity/device 320, and the user mobile computing device 341 and process the notifications to determine risk. The risk management system 305 may include one or more databases for associating one or more mobile computing devices 141 and/or one or more IoT devices 310, autonomous entity/devices 320, and user mobile computing devices 341.

Generally, the risk management system 305 may include a logic engine that provides a protocol-agnostic data aggregator of sensor data across a diverse set of sensor-enabled products across many manufacturers, i.e. via the IoT 220 for autonomous entities such as 1) autonomous vehicles and 2) drones for surveillance and delivery of goods. The risk management system 305 may receive data and input from a variety of IoT sensors 312 feeding into the IoT 220, such as from autonomous vehicles, drones, sensors and infrastructure, and smart homes and buildings. The risk management system 305 may use artificial intelligence algorithms and tools to process in real-time the large sets of data to analyze patterns with cross-device and cross-industry insights and then send alerts and messages to relevant entities based on the patterns. The risk management system 305 may provide one or more of the following features: 1) identify unusual or novel patterns and pre-defined data patterns in sensor data that indicate that a risk is occurring or is imminent; 2) send notifications to subscribers or relevant entities about either standard risk patterns or unusual patterns; and/or 3) facilitate inter-device communication to provide real-time warnings between devices.

The risk management system 305 may identify unusual or novel patterns and pre-defined data patterns in sensor data that indicate that a risk is occurring or is imminent. In one example embodiment, the risk management system 305 may identify unusual or novel patterns and pre-defined patterns by utilizing the following: a) a list of acceptable objects that are not considered a risk for a particular location; b) an exception list or table containing risks that violate the acceptable objects list for the particular location, such as a predefined object or an unrecognized object; or c) a list of subscribers and the types of notifications the subscribers wish to receive for a particular location. The risk management system 305 may conduct progressive shape differentiation scans of tiled, digitized image data using spatial outlier feature analysis to detect abnormal objects in transmitted satellite images or other sensor information and data. The risk management system 305 may utilize a methodology that compares image tiles to prior image tiles of the same region and compared to a standard object library of risk object images (e.g. fire, smoke). The risk management system 305 may detect images variations that can be identified to contain various risk features such as smoke, fire, flooding, unexpecting vehicles and unexpected human presence and movements. A risk outlier may be considered to be a risk factored object that has not been identified in same tile area since previous scan and is not listed in a system managed list of acceptable objects of expected, acceptable observed objects for a given tile or location.

The risk management system 305 may determine these patterns in sensor data by using a scoring algorithm for valuing new data patterns and determining the potential impact to the risk. The risk management system 305 may identify new patterns that indicate a new risk via artificial intelligence algorithms that would identify patterns that deviate from norm and indicate potential risks. As an example, a convolutional Neural Network image classifier-type algorithm may but utilized or be suitable for classification and identification of images and data of known risk (e.g. a fire) anomaly detection. The risk management system 305 may also determine any subscribers that might be interested in a new data risk pattern and push those alerts about the new data risk patters to interest subscribers via artificial intelligence and human involvement. Additionally, the risk management system 305 may add any new data patterns to a library of already known data patterns. Further, the risk management system 305 may share an alert as an application programming interface, API-based subscription to likely consumer subscribers.

The risk management system 305 may also send notifications to subscribers or relevant entities about either standard risk patterns or unusual patterns by developing a risk assessment profile of risks about what a given type of consumer would be interested in. Additionally, the risk management system 305 may alert organizations and individual consumers (such as, government agencies, retail, individual users, home owners, insurance companies) of a potential risk. The risk management system 305 may develop a risk assessment profile of risks that a given type of consumer would be interested in (e.g. imminent flood in a flood area). The risk management system 305 may also input these risk assessment profiles into the logic engine for further artificial intelligence and real-time learning. The risk management system 305 may output filtered data for the profiling of data of interest to that new risk assessment profile when specified risks occur (or a known pattern has occurred). The risk management system 305 may include a subscription service via an API for subscribers to obtain data.

The risk management system 305 may facilitate inter-device communication to provide real-time warnings between devices by utilizing the output from other nearby devices based upon location, speed, direction, and mapping. The risk management system 305 may provide inter-device communications that facilitate devices with inter-device communications that can receive near-time output from other near-by devices regardless of manufacturer and/or protocol. The risk management system 305 may notify a device about one of the following: inter-device proximity alerts, inter-device collision course alerts, inter-device dangerous conditions alerts (traffic, weather, accidents ahead, etc.).

Figure 5:
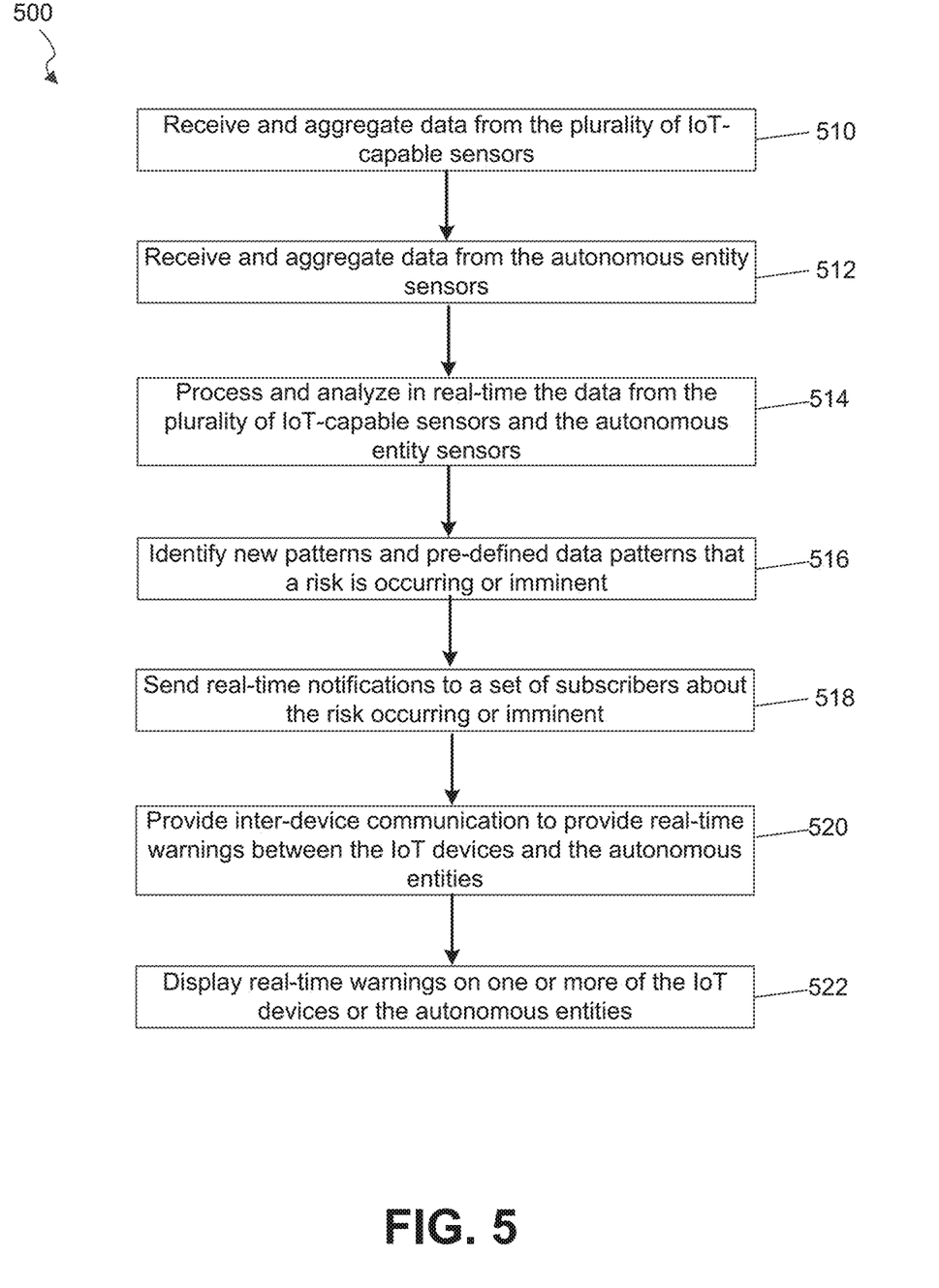
FIG. 5 is a block diagram of an exemplary risk management method according to one or more aspects described herein.

In an aspect of the disclosure, the risk management system 305 may include a plurality of IoT-capable sensors 312 connected to IoT devices 310 and an IoT system 220 and an IoT integrated logic engine connected to the IoT system 220. The plurality of IoT-capable sensors 312 may be configured to record data from the plurality of IoT sensor-enabled devices 310 within the IoT system 220. The plurality of sensor-enabled devices 310 may include one or more sensors and infrastructure for one or more smart homes and smart buildings. The plurality of sensor-enabled devices 310 may include one or more of autonomous entities/devices 320 and one or more autonomous vehicles and one or more drones. The IoT integrated logic engine include a processor that provides a protocol-agnostic data aggregator of the data from the plurality of IoT-capable sensors 312 connected to the IoT system 220. The processor and a memory unit storing computer-executable instructions, which when executed by the processor, cause the processor to perform a risk management method 500.

The risk management method 500 may include a first step 510, the risk management system 305 may receiving and aggregating data from the plurality of IoT-capable sensors 312 from the IoT devices 310. The risk management system 305 may aggregate data from a variety of industries, technologies, and manufacturers within the IoT 220. For example, the risk management system 305 may be a protocol-agnostic data aggregator from sensor data, and other pertinent data related to: security and surveillance; building management; vehicle, asset, person, and pet monitoring and controlling; agriculture automation; energy consumption; machine-to-machine (M2M) and wireless sensor network; everyday things; healthcare; embedded mobile; and smart homes and cities.

In a second step 512, the risk management system 305 may receive and aggregate data from the autonomous entity sensors 322 from the autonomous devices 320. The autonomous devices 320 may include, but not be limited to autonomous vehicles, drones for surveillance, drones for delivery of goods, and mail drones. The autonomous devices 320 may include a variety of sensors 322 that provide speed, direction, and mapping information.

In a next step 514, the risk management system 305 may process and analyze in real-time the data from the plurality of IoT-capable sensors 312 and the autonomous entity sensors 322. The processor may use artificial intelligence algorithms to process and analyze the data from the plurality of IoT-capable sensors 312.

In a next step 516, the risk management system 305 may identify new pattern and pre-defined data patterns that a risk is occurring or imminent. Additionally, the risk management system 305 may use a scoring algorithm for valuing new data from the plurality of IoT-capable sensors 312. Further, the risk management system 305 may determine a potential impact to the risk based on the new data and the scoring algorithm. In addition, the risk management system 305 may add any new data patterns to a library of known data patterns.

In a next step 518, the risk management system 305 may send real-time notifications to a set of subscribers about the risk occurring or imminent. Additionally, the risk management system 305 may develop a risk assessment profile of risks as to what a given subscriber from the set of subscribers would be most interested in. The set of subscribers may include one or more of the following: government agencies, retail organizations, home owners, and/or insurance companies.

In a next step 520, the risk management system 305 may provide inter-device communication to provide real-time warnings between the IoT devices 310 and the autonomous entities 320. The real-time warnings may include information from nearby sensor-enabled devices based upon location, speed, direction, and mapping. Additionally, the real-time warnings may include one or more of the following: inter-device proximity alerts, inter-device collision course alerts, and/or inter-device dangerous conditions alerts. the risk management system 305 may keep customers and/or the set of subscribers informed of real-time risks. Additionally, these real-time warnings may include coordinated warnings that are created by generalized systems, such as car collisions, gas leaks, and/or flooding. Other warnings from generalized systems may be included without departing from this invention.

In a next step 522, the risk management system 305 may display real-time warnings one or more of the IoT devices 310 or the autonomous entities 320.

In accordance with aspects of this invention, the risk management system 305 may enable fact-based rate pricing segmentation for the insurance industry. This rate pricing may be utilized for autonomous entities, such as for autonomous vehicles and/or autonomous drone insurance coverage.

In another aspect of the disclosure, the risk management system 305 may be available for customers such as vehicles, passengers, home owners, and/or owners of autonomous systems.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

While the preferred embodiments of the invention have been shown and described, it will be apparent to those skilled in the art that changes and modifications may be made therein without departing from the spirit of the invention, the scope of which is defined by this description.

We claim:

1. A risk management system, the system comprising:
   a plurality of internet of things (IoT)-capable sensors connected to an IoT system, the plurality of IoT-capable sensors configured to record data from a plurality of sensor-enabled devices within the IoT system;
   a plurality of autonomous entity sensors connected to the risk management system, the plurality of autonomous entity sensors configured to record data from a plurality of autonomous entity devices, wherein the autonomous entity devices include one or more of the following: one or more autonomous vehicles and one or more drones;
   an IoT integrated logic engine connected to the IoT system that includes a processor that provides a protocol-agnostic data aggregator of the data from the plurality of IoT-capable sensors connected to the IoT system; and
   the processor and a non-transitory memory unit storing computer-executable instructions, which when executed by the processor, cause the processor to:
   receive and aggregate data from the plurality of IoT-capable sensors from the plurality of sensor-enabled devices;
   receive and aggregate data from the plurality of autonomous entity sensors from the autonomous entity devices;
   process and analyze in real-time the data from the plurality of IoT-capable sensors and the autonomous entity sensors;
   identify novel patterns and pre-defined data patterns in the data from the plurality of IoT-capable sensors and the autonomous entity sensors;
   determine that a risk is occurring or imminent based on the novel patterns and pre-defined data patterns from the plurality of IoT-capable sensors and the autonomous entity sensors;
   send real-time notifications to a set of subscribers of the risk management system about the risk that is occurring or imminent; and provide inter-device communications to provide real-time warnings between one or more of the plurality of sensor-enabled devices and the autonomous entity devices.

2. The risk management system of claim 1, wherein the plurality of sensor-enabled devices includes one or more sensors and infrastructure or one or more smart homes and smart buildings.

3. The risk management system of claim 1, wherein the processor uses artificial intelligence algorithms to process and analyze the data from the plurality of IoT-capable sensors.

4. The risk management system of claim 1, further including the computer-executable instruction of using a scoring algorithm for valuing new data from the plurality of IoT-capable sensors.

5. The risk management system of claim 4, further including the computer-executable instruction to determine a potential impact to the risk based on the new data and the scoring algorithm.

6. The risk management system of claim 5, further including the computer-executable instruction to add the new data to a library of known data patterns.

7. The risk management system of claim 1, further including the computer-executable instruction to develop a risk assessment profile of risks as to what a given subscriber would be most interested in.

8. The risk management system of claim 1, wherein the set of subscribers includes one or more of the following: government agencies, retail entities, home owners, and insurance companies.

9. The risk management system of claim 1, wherein the real-time warnings include information from nearby sensor-enabled devices based upon location, speed, direction, and mapping.

10. The risk management system of claim 1, wherein the real-time warnings include one or more of the following: inter-device proximity alerts, inter-device collision course alerts, and inter-device dangerous conditions alerts.

11. One or more non-transitory computer readable media storing computer readable instructions that, when executed, cause an apparatus to:
(a) receive and aggregate data, by an internet of things (IoT) integrated logic engine connected to an IoT system, from a plurality of IoT-capable sensors from a plurality of sensor-enabled devices, the plurality of IoT-capable sensors connected to the IoT system and configured to record data from the plurality of sensor-enabled devices within the IoT system, wherein the IoT system includes a processor that provides a protocol-agnostic data aggregator of the data from the plurality of IoT-capable sensors connected to the IoT system;
(b) receive and aggregate data, by the IoT integrated logic engine, from a plurality of autonomous entity sensors from one or more autonomous entity devices, the plurality of autonomous entity sensors connected to the IoT integrated logic engine and configured to record data from the plurality of autonomous entity devices, wherein the autonomous entity devices include one or more of the following: one or more autonomous vehicles and one or more drones;
(c) process and analyze in real-time the data, by the IoT integrated logic engine, from the plurality of IoT-capable sensors and the autonomous entity sensors;
(d) identify novel patterns and pre-defined data patterns in the data, by the IoT integrated logic engine, from the plurality of IoT-capable sensors and the autonomous entity sensors;
(e) determine, by the IoT integrated logic engine, that a risk is occurring or imminent based on the novel patterns and pre-defined data patterns from the plurality of IoT-capable sensors and the autonomous entity sensors;
(f) send real-time notifications, by the IoT integrated logic engine, to a set of subscribers about the risk that is occurring or imminent; and
(g) provide inter-device communications, by the IoT integrated logic engine, to provide real-time warnings between the plurality of IoT-capable sensors and the autonomous entity sensors.

12. The one or more non-transitory computer readable media storing computer readable instructions of claim 11, wherein the plurality of sensor-enabled devices includes one or more sensors and infrastructure or one or more smart homes and smart buildings.

13. The one or more non-transitory computer readable media storing computer readable instructions of claim 11, further including the instruction of:
(h) developing a risk assessment profile of risks as to what a given subscriber would be most interested in.

14. The one or more non-transitory computer readable media storing computer readable instructions of claim 11, wherein the set of subscribers includes one or more of the following: government agencies, retail entities, home owners, and insurance companies.

15. The one or more non-transitory computer readable media storing computer readable instructions of claim 11, wherein the real-time warnings include information from nearby sensor-enabled devices based upon location, speed, direction, and mapping.

16. The one or more non-transitory computer readable media storing computer readable instructions of claim 11, wherein the real-time warnings include one or more of the following: inter-device proximity alerts, inter-device collision course alerts, and inter-device dangerous conditions alerts.

17. A risk management system, the system comprising:
a plurality of internet of things (IoT)-capable sensors connected to an IoT system, the plurality of IoT-capable sensors configured to record data from a plurality of sensor-enabled devices within the IoT system;
a plurality of autonomous entity sensors connected to the risk management system, the plurality of autonomous entity sensors configured to record data from a plurality of autonomous entity devices, wherein the autonomous entity devices include one or more of the following: one or more autonomous vehicles and one or more drones;
an IoT integrated logic engine connected to the IoT system that includes a processor that provides a protocol-agnostic data aggregator of the data from the plurality of IoT-capable sensors connected to the IoT system; and
the processor and a non-transitory memory unit storing computer-executable instructions, which when executed by the processor, cause the processor to:
receive and aggregate data from the plurality of IoT-capable sensors from the plurality of sensor-enabled devices;

receive and aggregate data from the plurality of autonomous entity sensors from the autonomous entity devices;
process and analyze in real-time the data from the plurality of IoT-capable sensors and the autonomous entity sensors;
identify novel patterns and pre-defined data patterns in the data from the plurality of IoT-capable sensors and the autonomous entity sensors;
determine that a risk is occurring or imminent based on the novel patterns and pre-defined data patterns from the plurality of IoT-capable sensors and the autonomous entity sensors;
utilize a scoring algorithm for valuing new data from the plurality of IoT-capable sensors and the plurality of autonomous entity sensors;
determine a potential impact to the risk based on the new data and the scoring algorithm;
send real-time notifications to a set of subscribers of the risk management system about the risk that is occurring or imminent; and
provide inter-device communications to provide real-time warnings between one or more of the plurality of sensor-enabled devices and the autonomous entity devices, wherein the real-time warnings include information from nearby sensor-enabled devices based upon location, speed, direction, and mapping, and further wherein the real-time warnings include one or more of the following: inter-device proximity alerts, inter-device collision course alerts, and inter-device dangerous conditions alerts.

18. The risk management system of claim 17, wherein the plurality of sensor-enabled devices includes one or more sensors and infrastructure or one or more smart homes and smart buildings.

19. The risk management system of claim 17, further including the computer-executable instruction to develop a risk assessment profile of risks as to what a given subscriber would be most interested in.

20. The risk management system of claim 17, wherein the set of subscribers includes one or more of the following: government agencies, retail entities, home owners, and insurance companies.

\* \* \* \* \*